(12) United States Patent
Liao et al.

(10) Patent No.: US 6,188,572 B1
(45) Date of Patent: Feb. 13, 2001

(54) MOVABLE DOCKING STATION ELECTRICAL CONNECTOR

(75) Inventors: Reynold L. Liao, Austin; Sean P. O'Neal, Round Rock, both of TX (US)

(73) Assignee: Dell USA, L.P., Austin, TX (US)

( * ) Notice: Under 35 U.S.C. 154(b), the term of this patent shall be extended for 0 days.

(21) Appl. No.: 09/170,907

(22) Filed: Oct. 13, 1998

(51) Int. Cl.$^7$ .............................. H05K 5/00; H05K 7/00
(52) U.S. Cl. .................. 361/686; 361/683; 312/223.1; 312/223.2
(58) Field of Search .................... 361/686, 683; 439/607; 312/223.1, 223.2

(56) References Cited

U.S. PATENT DOCUMENTS

| | | | |
|---|---|---|---|
| 4,718,858 | 1/1988 | Godfrey et al. | 439/296 |
| 5,182,698 | 1/1993 | Kobayashi et al. | 361/395 |
| 5,186,646 | 2/1993 | Pederson | 439/374 |
| 5,265,238 | 11/1993 | Canova, Jr. et al. | 395/500 |

(List continued on next page.)

FOREIGN PATENT DOCUMENTS

| | | | |
|---|---|---|---|
| 0 687 969 A2 | 6/1995 | (EP) | G06F/1/16 |
| 0 689 121 A1 | 6/1995 | (EP) | G06F/1/16 |

OTHER PUBLICATIONS

Robert L. McMahan and Sergey G. Podwalmy, "Portable Computer Docking System", Jan. 21, 1997, 08/786,168, 29 pages, 12 sheets of drawings (Fig. 1; Fig. 1A; and Figs. 2–11).

*Primary Examiner*—Leo P. Picard
*Assistant Examiner*—Tung Minh Bui
(74) *Attorney, Agent, or Firm*—Skjerven, Morrill, MacPherson, LLP; David G. Dolezal

(57) ABSTRACT

A docking station having an electrical connector for mating with the electrical connector of the portable computer when the portable computer is operably coupled to the docking station. The docking station electrical connector is movable with respect to the housing between at least two mating positions to accommodate for variations in location of portable computer electrical connectors of different portable computer types. The docking station electrical connector extends out from a slot in a back wall of the docking station housing. The docking station electrical connector can be manually moved or moved by a motor. With some docking stations according to the present invention, the docking station electrical connector is moveable between mating positions at different elevations. For some docking stations, the slot that the docking station electrical connector extends out from has at least two levels each at a different elevation. With other docking stations, the elevation of the connector can be adjusted by, for example, turning a knob to set the proper elevation.

38 Claims, 7 Drawing Sheets

U.S. PATENT DOCUMENTS

| | | | |
|---|---|---|---|
| 5,287,460 | 2/1994 | Olsen et al. | 395/275 |
| 5,313,596 | 5/1994 | Swindler et al. | 395/325 |
| 5,323,291 | 6/1994 | Boyle et al. | 361/683 |
| 5,347,425 | 9/1994 | Herron et al. | 361/683 |
| 5,396,400 | 3/1995 | Register et al. | 361/686 |
| 5,402,316 | 3/1995 | Volz et al. | 361/785 |
| 5,436,792 | 7/1995 | Leman et al. | 361/686 |
| 5,447,442 | 9/1995 | Swart | 439/77 |
| 5,477,415 | 12/1995 | Mitcham et al. | 361/686 |
| 5,526,493 | 6/1996 | Shu | 395/281 |
| 5,535,093 * | 7/1996 | Noguchi et al. | 361/686 |
| 5,544,005 | 8/1996 | Horikoshi et al. | 361/680 |
| 5,552,959 | 9/1996 | Penniman et al. | 361/686 |
| 5,555,491 | 9/1996 | Tao | 361/686 |
| 5,579,487 | 11/1996 | Meyerson et al. | 395/280 |
| 5,592,362 | 1/1997 | Ohgami et al. | 361/686 |
| 5,603,639 * | 2/1997 | Lai et al. | 439/607 |
| 5,619,398 | 4/1997 | Harrison et al. | 361/686 |
| 5,627,450 | 5/1997 | Ryan et al. | 320/15 |
| 5,633,782 | 5/1997 | Goodman et al. | 361/683 |
| 5,657,201 | 8/1997 | Kochis | 361/686 |
| 5,694,292 | 12/1997 | Paulsel et al. | 361/686 |
| 5,699,226 | 12/1997 | Cavello | 361/686 |
| 5,737,541 | 4/1998 | Shimizu et al. | 395/281 |
| 5,751,546 | 5/1998 | Clark et al. | 361/686 |
| 5,754,397 * | 5/1998 | Howell et al. | 361/686 |
| 5,769,646 | 6/1998 | Cavello et al. | 439/136 |
| 5,812,356 * | 9/1998 | O'Connor | 361/179 |
| 5,933,321 * | 8/1999 | Ruch et al. | 361/686 |

* cited by examiner

TOP VIEW

MOVABLE DOCKING STATION ELECTRICAL CONNECTOR

BACKGROUND OF THE INVENTION

1. Field of the Invention

This invention relates in general to computer systems and more specifically to electrical connectors for portable computer docking stations.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebook or portable computers, and embedded systems. Personal computer (PC) systems, such as International Business Machines (IBM) compatible PC systems, include desk top, floor standing, or portable versions. A typical PC system includes a microprocessor, associated memory and control logic, and a number of peripheral devices that provide input and output for the system. Such peripheral devices may include display monitors, keyboards, mouse-type input devices, floppy and hard disk drives, CD-ROM drives, printers, network cards, terminal devices, modems, televisions, sound devices, voice recognition devices, electronic pen devices, and mass storage devices such as tape drives, CD-R drives or DVDs.

Portable computers (also referred to as laptop or notebook computers) have become increasingly popular due to their light weight and small size. Such computers can be easily hand-carried in briefcase sized cases and may be used by business travelers in cramped spaces, such as on airline seat back trays. In addition, portable computers typically can be battery powered or powered from an AC to DC converter. Portable computers typically incorporate a flat panel display such as a liquid crystal display (LCD) or other relatively small display that can be, for example, built into its lid portion. Portable computers typically include a keyboard built into its main body portion. The modern portable computer may also have incorporated therein both hard and floppy disk drives, system RAM memory, and a system processor. A portable computer can be a fully self-contained computer system able to be conveniently used in situations and locations in which the use of a much larger desktop computer is not feasible.

A docking station allows a portable computer to be used as a desktop computer for use in the home or office. Docking stations typically facilitate the operable coupling of the system processor and memory of the portable computer to peripheral devices either housed in the docking station (e.g. a CD ROM drive) or operably coupled to the docking station (e.g. an external mouse, keyboard, monitor, or printer). Such peripherals devices which are operably coupled to connectors located on the docking station housing are typically left at the home or office when the portable computer is removed for use outside the home or office. Docking station housings are typically designed to be set on a desktop, however some docking station housings may be floor standing as well. One example of a docking station is the PORT REPLICATOR II sold by DELL COMPUTER CORP.

A docking station typically works well for the specific portable computer type for which it was designed. However, because the location of a docking station electrical connector may vary with different portable computer types such as different portable computer models, a particular docking station is only compatible with portable computer types having corresponding electrical connectors located at a compatible mating position with the portable computer electrical connector.

What is desirable is a docking station having an electrical connector that is movable with respect to the housing between at least two mating positions to accommodate for variations in location of corresponding portable computer electrical connectors of different portable computer types.

SUMMARY OF THE INVENTION

It has been discovered that providing a docking station with an electrical connector that is movable with respect to the housing of a docking station between at least two mating positions advantageously allows the docking station to accommodate for variations in the location of corresponding portable computer electrical connectors of different portable computer types.

In one aspect of the invention, a docking station for a portable computer includes a housing and a docking station electrical connector physically coupled to the housing. The docking station electrical connector is for mating with a corresponding electrical connector of a portable computer when the portable computer is operably coupled to the docking station. The docking station electrical connector is movable with respect to the housing between at least two mating positions to accommodate for variations in location of corresponding portable computer electrical connectors of different portable computer types.

In another aspect of the invention, a docking station for a portable computer includes a housing and a docking station electrical connector physically coupled to the housing for mating with a corresponding electrical connector of a portable computer when the portable computer is operably coupled to the docking station. The docking station also includes means for moving the docking station electrical connector with respect to the housing between at least two mating positions to accommodate for variations in location of corresponding portable computer electrical connectors of different portable computer types.

In another aspect of the invention, a computer system includes a portable computer having an electrical connector. The computer system also includes a docking station. The docking station includes a housing and a docking station electrical connector physically coupled to the housing. The docking station electrical connector is for mating with the electrical connector of the portable computer when the portable computer is operably coupled to the docking station. The docking station electrical connector is movable with respect to the housing between at least two mating positions to accommodate for variations in location of portable computer electrical connectors of different portable computer types.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1:
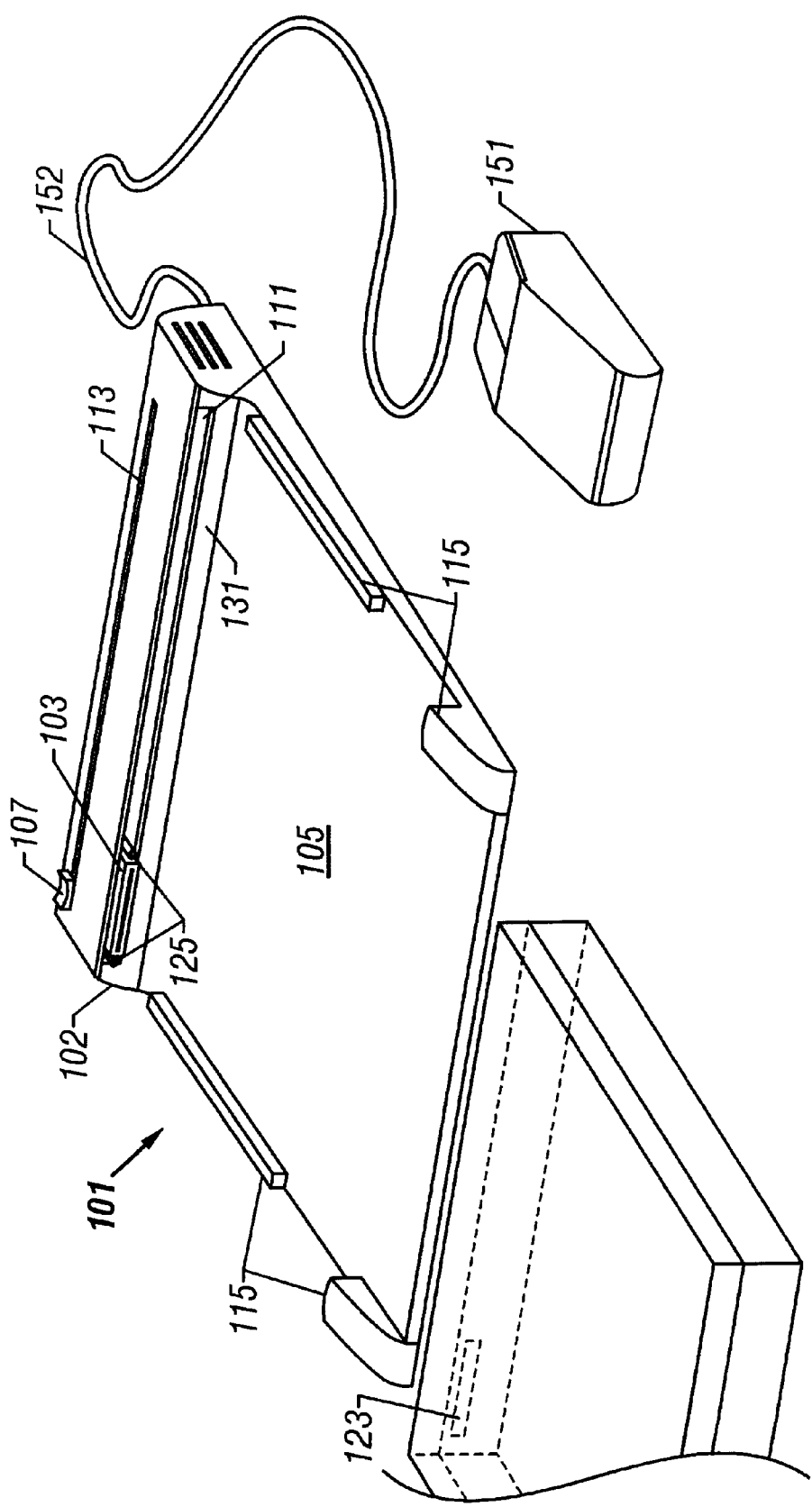
FIG. 1 is a perspective view of a docking station and a portable computer according to the present invention.
Figure 9:
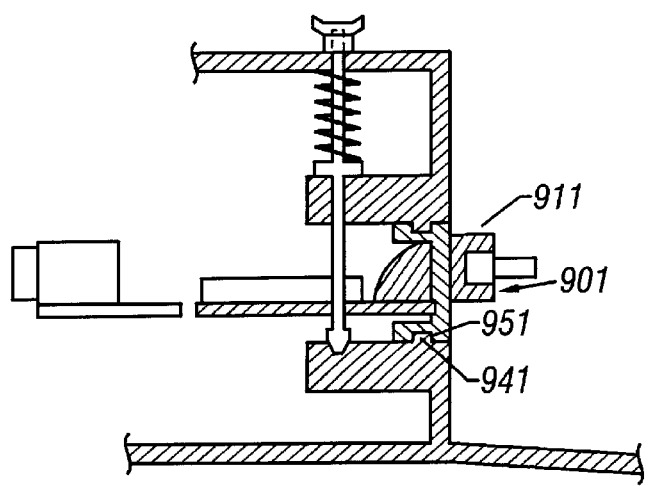
FIG. 9 shows a partial cutaway side view of another docking station electrical connector body of another docking station housing according to the present invention.

FIG. 1 shows a perspective view of a portable computer and a docking station having an electrical connector that is movable between different mating positions to accommodate for variations in location of corresponding portable computer electrical connectors of different portable computer types according to the present invention. Docking station 101 includes an electrical connector 103 for mating with a corresponding electrical connector 123 located on the backside of portable computer 121 to operably couple portable computer 121 to peripheral devices housed in docking station 101 or operably coupled to docking station 101 via other conventional docking station electrical connectors (not shown) located, for example, on the side or back of housing 102. For example, a cord 152 for mouse 151 terminates at a connector (not shown) that is connected to a second connector (not shown) located on the backside of docking station 101. Electrical connector 103 extends out from a slot 111 in back wall 131 of docking station housing 102. Also extending out from slot 111 are two guide pins 125 which, during the docking of portable computer 121, are inserted into corresponding guide holes (not shown) adjacent to portable computer electrical connector 123 for alignment of docking station electrical connector 103 with the portable computer electrical connector 123. In FIG. 1, docking station electrical connector 103 is a board-to-board shielded type electrical connector with a leaf style contact such as a connector having a Mfr. No. 4-11258-2 sold by the AMP CORP. FIG. 9 shows a partial cutaway view of another embodiment, in which a docking station has a housing that includes rails 941 located on the interior walls of slot 911. A docking station connector body 901 includes corresponding grooves 951 that engage rails 941 to allow connector body 901 to be movable along rails 941 in slot 911.

To operably couple portable computer 121 to docking station 101, portable computer 121 is placed on base 105 (also referred to as tray, platform, bay, or floor) with the backside of portable computer 121 facing back wall 131. Portable computer 121 is slid towards back wall 131 while being aligned by guide structures 115 such that portable computer electrical connector 123 is aligned to be mated with docking station electrical connector 103 for the mating position shown in FIG. 1. With other types of docking stations, the portable computer may be inserted into an enclosed bay of the docking station for docking. Also, with other types of docking stations, the movement of the portable computer towards the docking station electrical connector may be motorized.

Docking station electrical connector 103 is movable along slot 111 so as to be positioned at various mating positions that correspond to the positions of portable computer electrical connectors of different portable computer types. For example, in FIG. 1, portable computer docking connector 123 is located at the left side of the portable computer, relative to the view shown in FIG. 1. Accordingly, to be mated with portable computer electrical connector 123, docking station electrical connector 103 is positioned at the left most edge of slot 111 as shown in FIG. 1. Another type of portable computer (not shown) may have its electrical connector located on the right side of the back panel. Accordingly, docking connector 103 is movable within slot 111 to be positionable on the right side of back wall 131 to be mated with the electrical connector of the portable computer of the second type.

Docking station 101 includes an adjustment knob 107 that is fixably coupled to docking station electrical connector 103. Knob 107 is actuated to move the electrical connector in slot 111. Knob 107 extends out of slot 113 and travels along slot 113 when the docking station electrical connector 103 is being moved to a different mating position.

Figure 2:
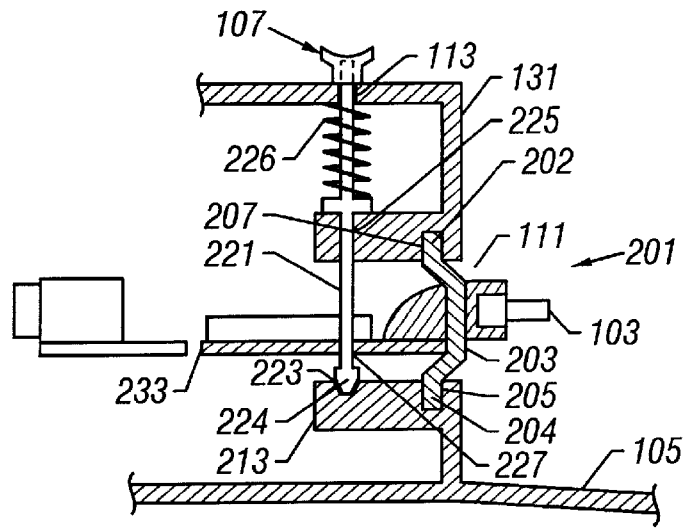
FIG. 2 shows a partial cutaway side view of docking station electrical connector body of a docking station housing according to the present invention.

FIG. 2 shows a partial side cutaway view of docking station 101. Docking connector 103 is part of a docking station connector body 201 that moves with respect to the docking station housing. Docking station connector body 201 includes a sliding plate 203 that is fixably attached to docking station electrical connector 103. Sliding plate 203 includes an upper wing structure 202 and a lower wing structure 204 that reside in and travel in upper groove 207 and lower groove 205, respectively. Upper grove 207 and lower groove 205 are located in the interior side walls of slot 111 and run along slot 111. Wing structures 202 and 204 and grooves 205 and 207 cooperatively act to provide a restraining force on connector 103 to secure the connector within slot 111 and to prevent all movement of connector 103 except a lateral horizontal movement along slot 111. Other docking stations (not shown) may have a housing that includes rails located on the interior walls of the slot. A docking station connector body (not shown) would include corresponding grooves that would engage the rails to allow the connector body to be movable along the rails in the slot.

Docking station 101 includes a retaining mechanism to provide a retaining force against an undesired lateral horizontal movement of connector 103 along slot 111. The retaining mechanism includes a pin structure 221 attached to knob 107. Pin structure 221 extends through slot 113, slot 225, and pin hole 227. Pin hole 227 is a hole in structure 233 of docking station connector body 201 that laterally couples pin structure 221 to connector body 201. Slot 225 runs along parallel with slot 113 to allow pin structure 221 to move through the inner wall of slot 111.

Pin structure 221 includes a pin head 224 that resides within a corresponding pin hole 223 in interior wall 213 of slot 111. Pin head 224 residing in hole 223 provides a retaining force on pin structure 221 and correspondingly on the docking station connector body 201 to prevent the undesired lateral movement of connector body 201, thereby retaining docking station electrical connector 103 in a mating position.

To move connector 103 to another mating position to accommodate for another portable computer type, knob 107 is lifted upwards to disengage pin head 224 from hole 223. A force having a lateral component is then applied to knob 107 in the raised position to move connector 103 along slot 111 to another mating position. When connector 103 is in the desired mating position, knob 107 is released, whereby spring 226 provides a force on pin structure 221 to move pin head 224 into another hole (not shown) in the interior wall 213 to retain connector 103 in the second mating position.

Figure 3:
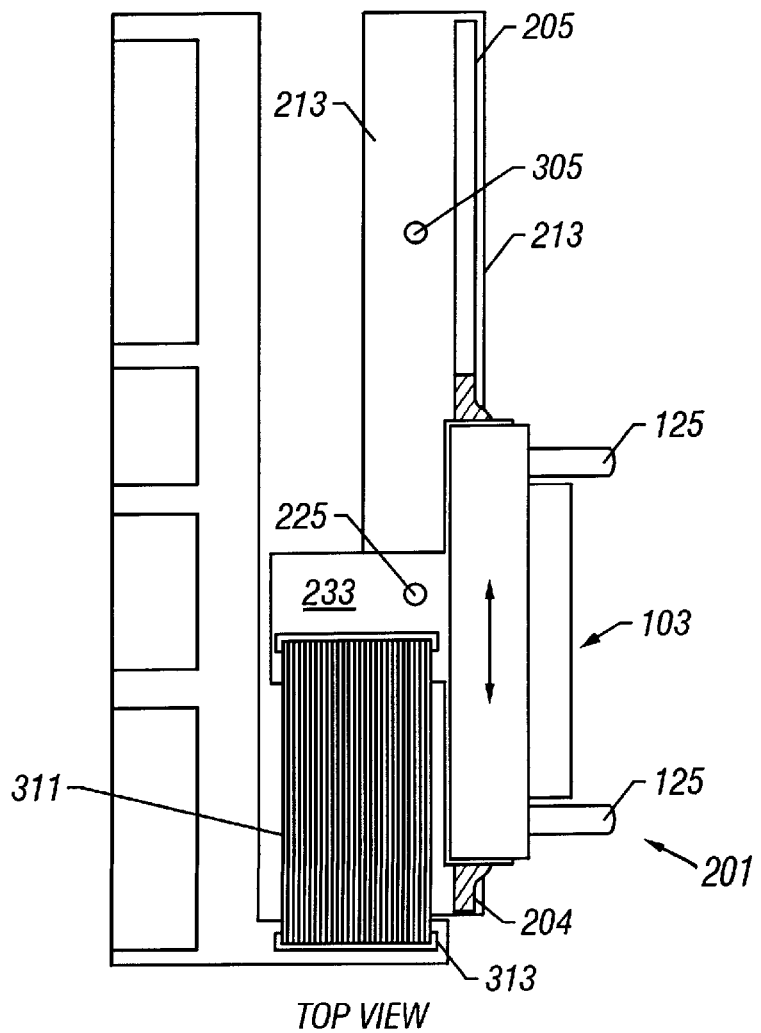
FIG. 3 shows a top view of a docking station electrical connector body according to the present invention.

FIG. 3 shows a top view of the docking station electrical connector body and portions of the docking station housing. Docking station connector body 201 (including electrical connector 103) is shown in the first mating position. Hole 305 in lower wall 213 of slot 111 receives pin structure 221 (not shown in FIG. 3) to retain connector body 201 (including connector 103) in a second mating position.

Docking station 101 includes a flexible multiconductor ribbon cable to electrically couple electrical connector 103 to the rest of the docking station. Each conductor of cable 311 is electrically coupled to an individual pin structure conductor of connector 103. Providing a flexible ribbon cable allows electrical connector 103 to be movable while enabling connector 103 to remain electrically coupled to docking station 101. With docking station 101, ribbon cable 311 folds within the housing when docking connector body 201 is located adjacent to one end of cable 311 connected to connector 313 secured to docking station housing 201. With other docking stations, the ribbon cable is secured to a retracting mechanism that is biased to retract or roll up the excess cable. The lateral component of a force required to move a connector body would overcome the bias of the retracting mechanism to unroll the cable when moving the electrical connector body to a mating position located further away from the retracting mechanism.

Although two holes 305 and 223 corresponding to two mating positions are shown in FIGS. 2 and 3, a docking station according to the present invention may include a greater number of pin holes corresponding to a greater number of mating positions located along slot 111.

Figure 4A:
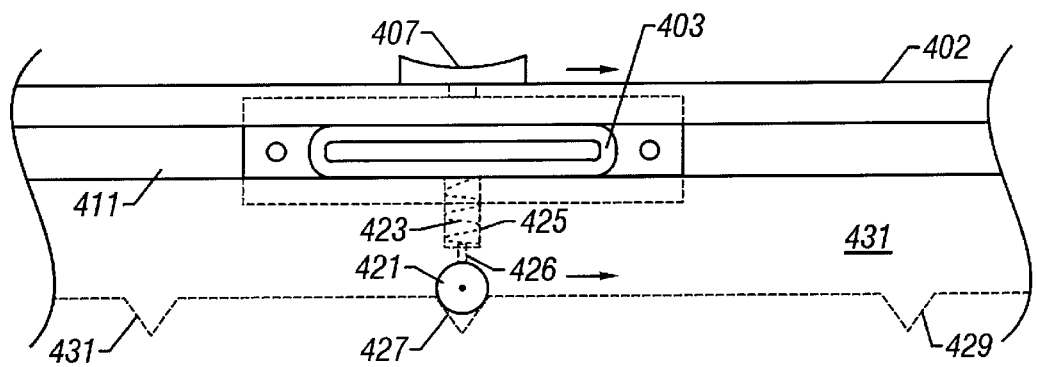
FIGS. 4A and 4B show front views of docking station electrical connectors and retaining mechanisms for providing forces to retain a docking station electrical connector according to the present invention.
Figure 4B:
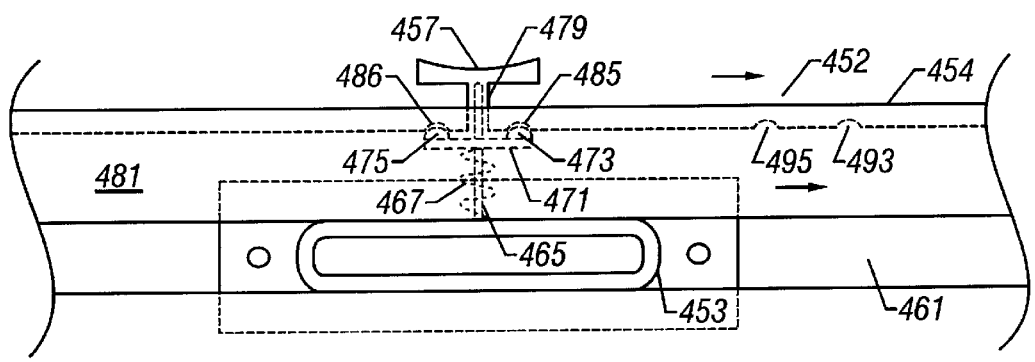

FIGS. 4A and 4B are partial front views of alternative retaining mechanisms to prevent the undesired lateral movement of a docking station electrical connector when in a mating position. Referring to FIG. 4A, docking station electrical connector 403 extends out from slot 411 in back wall 431 of docking station housing 402. Knob 407 extends out from a slot (not shown) located on the top side of housing 402 and is fixably coupled to electrical connector 403 via other structures of the connector body (not shown) located behind connector 403, relative to the view shown in FIG. 4A. Physically attached to the connector body is a spring piston 425 with a wheel 421 rotatably attached to piston arm 426 of spring piston 425. Spring 423, located in spring piston 425, provides a downward force on piston arm 426 which provides a downward force on wheel 421. Wheel 421 is shown residing in a notch 427 of a ledge of docking station housing 402. The downward force on wheel 421 by spring 423 into notch 427 acts to retain connector 403 in the mating position shown in FIG. 4A.

To move connector 403 to a second mating position located to the right, relative to the view shown in FIG. 4A, of its current mating position, a user applies a force having a rightward component on knob 407, relative to the view shown in FIG. 4A. The rightward component of the force moves the connector body to the right wherein wheel 421 rolls up the right slope of notch 427, relative to the view shown in FIG. 4A. The rightward component of the user's force must be sufficient to overcome the increased resisting force of spring 423 on piston arm 426 as the piston arm moves upward due to wheel 421 climbing the right slope of notch 427. Connector 403 is further moved to the right until it reaches its second mating position where wheel 421 resides in notch 429. The spring piston structure may include a clicking mechanism that clicks each time wheel 421 extends downward due to entering a notch so as to indicate to a user that electrical connector 403 has reached a mating position. Docking station 401 also includes a third notch 431 corresponding to a third mating position of connector 403.

FIG. 4B shows another type of retaining mechanism for preventing the undesired movement of the docking station electrical connector from a mating position. Docking station electrical connector 453 extends out from slot 461 in back wall 481 of housing 452. Knob 457 extends out from a slot (not shown) of housing 452 and is physically coupled to electrical connector 453 via pin 465, spring 467, and other structures (not shown) of the connector body (not shown) located behind connector 453, relative to the view shown in FIG. 4B. Knob 457 is fixably attached to a detent structure 471 that reside within the housing 452. Detent structure 471 includes two detents 473 and 475 which face upwards and are located forward from (or alternatively backwards from) knob shaft 479. Spring 467 provides an upward force, relative to the view shown in FIG. 4B, to force detents 473 and 475 into notches 485 and 486, respectively. Notches 485 and 486 are located on the underneath side of upper wall 454 of housing 452. The upward force of the detents 473 and 475 into notches 485 and 486 prevents the undesired lateral movement of connector 453 in slot 461.

To move connector 453 to the right, relative to the view shown in FIG. 4B, to a second mating position, a user actuates knob 457 by pressing down on knob 457. This downward force moves knob 457, detent structure 471, and detents 473 and 475 downward with respect to pin structure 465. Moving detents 473 and 475 downward disengages the detents from notches 485 and 486 allowing a user to further actuate knob 457 by applying a force on the knob having a rightward component, relative to the view shown in FIG. 4B, to move electrical connector 453 to the right along slot 461. When electrical connector 453 reaches the second mating position, the upward force of spring 467 forces the detents 473 and 475 upward into notches 493 and 495, respectively, which correspond to the second mating position. The force upward on detents 473 and 475 into notches 493 and 495, respectively, prevents the undesired lateral movement of electrical connector 103 when in the second mating position.

Those of skill in the art will appreciate, based upon the teachings herein, that other retaining mechanisms may be used to prevent the undesired movement of the docking station electrical connector from a mating position. For example, referring to FIG. 4B, detent structure 471 may include notches for receiving detents located on the under side of top wall 454. Also with other types of docking stations, a screw or pin structure may be used to prevent an undesired movement of the docking station electrical connector from a desired mating position. For example, a screw may be inserted from the bottom of the docking station electrical connector and screwed into a threaded holed of the docking station connector body when the docking station is in a desired mating position. The screw may be inserted by a user, manufacture, or retailer.

Figure 5:
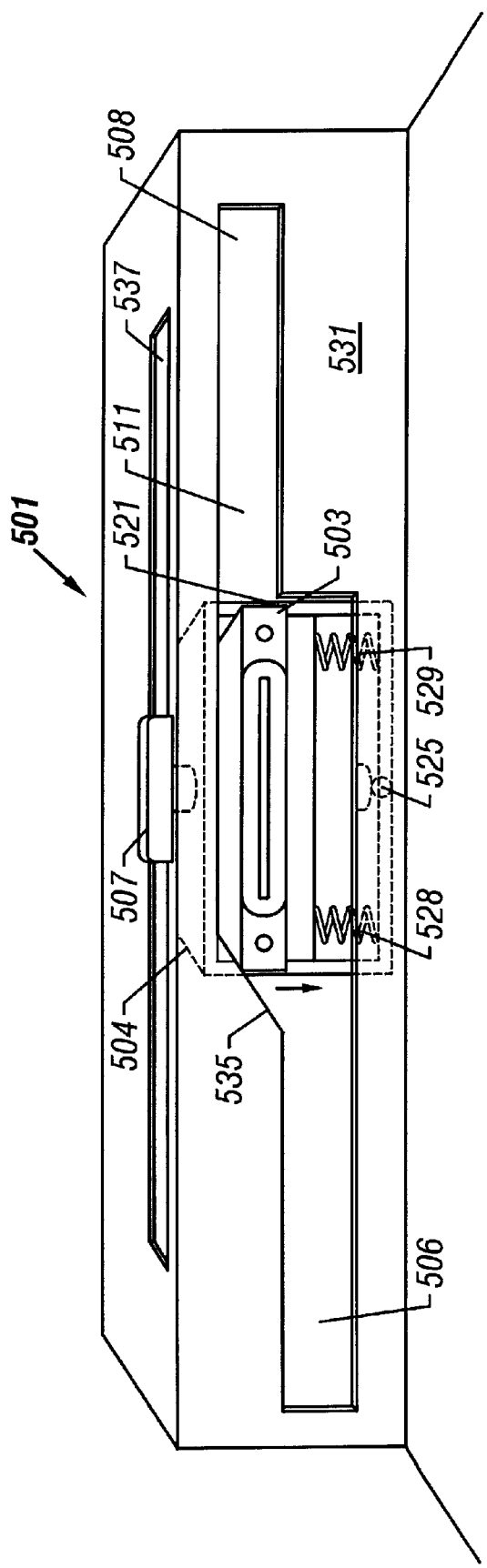
FIG. 5 shows a front view of a docking station having an electrical connector that is movable between mating positions at different elevations according to the present invention.

Referring to FIG. 5, the mating positions of an electrical connector of a portable computer may be at different elevations for different portable computer types. For example, for thin portable computers, the electrical connector may be located closer to the bottom side of the portable computer than for a thicker portable computer. FIG. 5 is a front view of a docking station having a docking connector that is movable between mating positions located at different elevations. Docking station electrical connector 503 extends out from slot 511 and moves between mating position at different elevations. A first mating position 506 at a lower elevation is located on the left side of slot 511, relative to the view shown in FIG. 5, and a second mating position 508 at a higher elevation is located on the right side of slot 51 1. In addition to electrical connector 503, the docking station electrical connector body 504 includes a connector carriage 521 located behind backwall 531. Connector 503 extends out from carriage 521 and is movable with respect to carriage 521 in a generally vertically orientation. The docking station connector body 504 also includes two springs 528 and 529 for providing a force upward on connector 503 with respect to carriage 521 to force connector 503 to the top of carriage 521 when unrestrained. Other connector bodies may include only one spring or more than two springs for providing an upward force.

Knob 507 is fixably attached to connector carriage 521 and extends out from slot 537. Wheel 525 is rotatably coupled to connector carriage 521 via a spring piston (not shown) similar to the spring piston of FIG. 4A. Wheel 525 is capable of residing in notches (not shown) at the left and right sides of docking station 501 corresponding to the mating positions in a similar manner to that shown in FIG. 4A.

To move connector 503 between the mating positions on the left 506 and right 508 of slot 511, a user actuates knob 507 by providing a force on knob 507 having a lateral component in the desired direction of movement to move connector body 504 including connector 503, in the desired direction. To move connector 503 to the left from mating position 508, the user applies a force on knob 507 having a leftward component. When connector body 504 reaches slated edge 535 of the sidewall of slot 511, the leftward force by the user forces connector 503 to move downwards with respect to carriage 521 (overcoming the force provided by springs 528 and 529) to the lower elevation of mating position 506 on the left side of slot 511. When connector reaches the left side of slanted edge 535, connector 503 is at the lower elevation.

In moving connector 503 to the right mating position 508 from the left mating position 506, as docking connector 503 is moved from the left side 506 to the right side 508 of slot 511, connector 503 rises upwards with respect to carriage 521 as permitted by slope 535.

Figure 6:
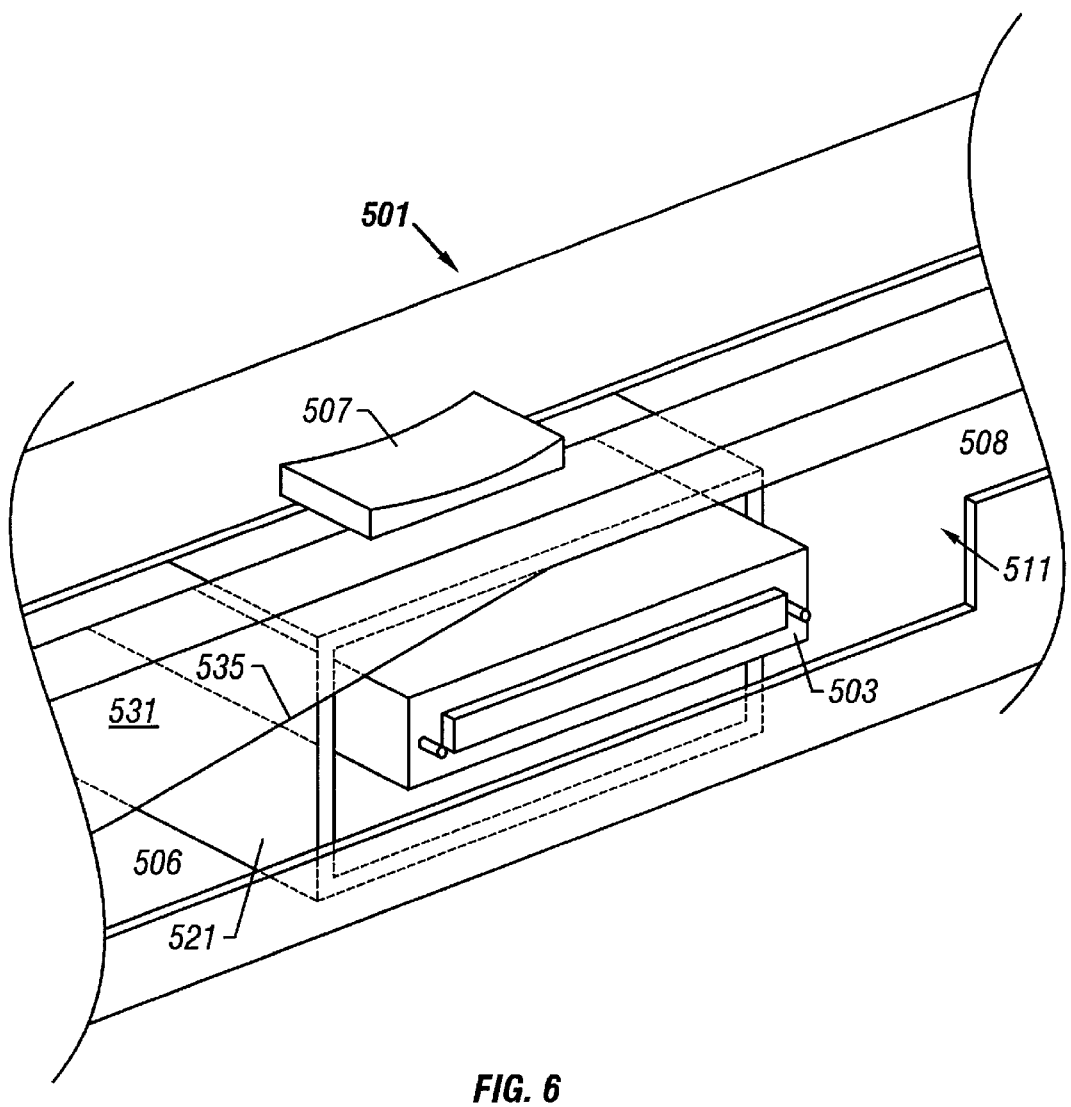
FIG. 6 shows a partial perspective view of the docking station of FIG. 5.

FIG. 6 shows a partial perspective view of docking station 501. Other docking stations may include slots having more that two levels with each level at a different elevation.

Figure 7:
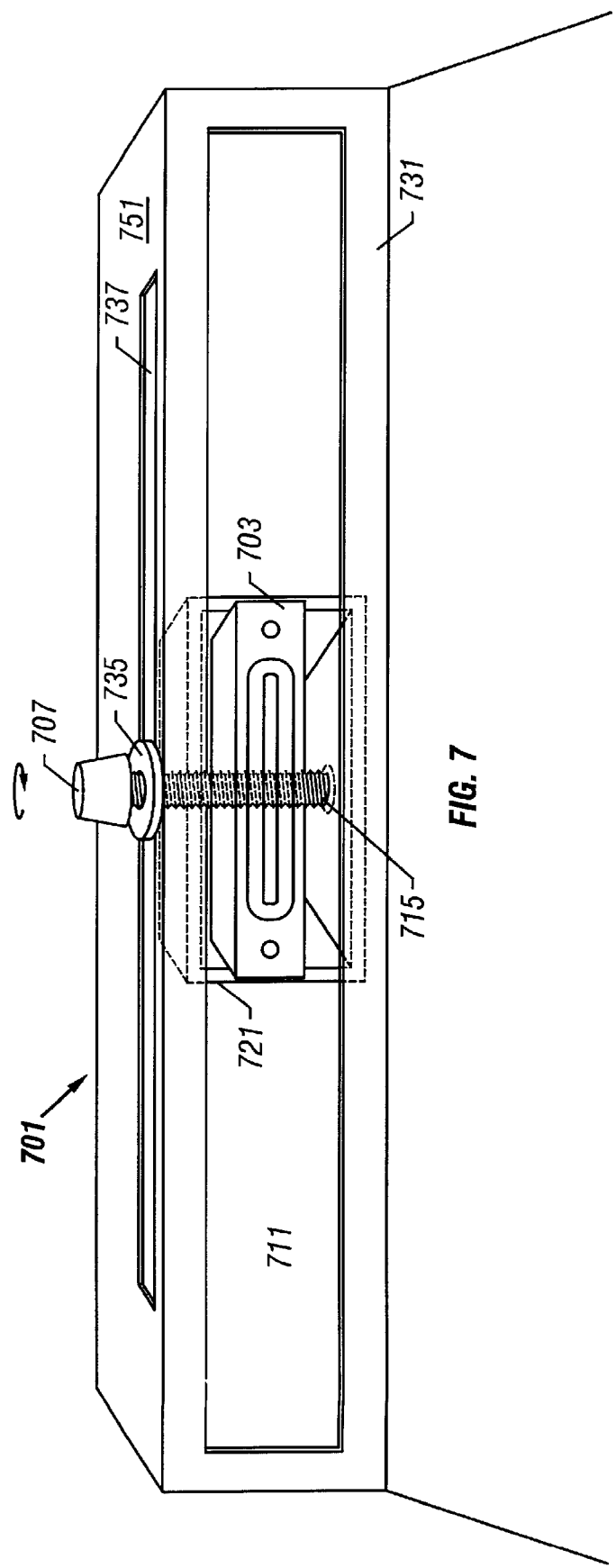
FIG. 7 shows a front view of another docking station having an electrical connector that is movable between mating positions at different elevations according to the present invention.

FIG. 7 shows another docking station having an electrical connector that is movable between mating positions at different elevations. Docking station electrical connector 703 is positionable to extend out of any position along slot 711. Docking station 701 includes a screw 715 extending from knob 707, down though docking carriage 721 behind connector 703 (relative to the view shown in FIG. 7), through a threaded hole in a structure (not shown) fixably coupled to connector 703, and terminates at the bottom side of carriage 721. Docking connector 703 is moved vertically relative to docking carriage 721 by turning knob 707. The bottom end of screw 715 that terminates at the bottom of carriage 721 is not threaded. Thus, turning knob 707 does not raise or lower carriage 721. Carriage 721 may also include vertically oriented slots located on the interior walls of carriage 721 for receiving wing structures or ridges fixably coupled to connector 703 to maintain the orientation of connector 703 during its vertical movement with respect to carriage 721.

To move docking connector 703 laterally, locking nut 735 is rotated to move locking nut 735 upwards from the top side 751 of docking station 701. Unclamping locking nut 735 from top side 751 allows the entire docking station connector body to be moved laterally with respect to the rest of docking station 701 by applying a force on knob 707 having a component in the desired direction. Once connector 703 is laterally aligned with the location of a corresponding portable computer electrical connector (not shown), locking nut 735 is tightened down against top side 751 to prevent the undesired lateral movement of docking connector 703 from the mating position. Knob 703 is rotated in the appropriate direction until docking connector 703 is at the proper elevation.

An advantage of docking station 701 is that connector 703 can be positioned to accommodate the location of a compatible portable computer docking connector for almost any type of portable computer. Thus, docking station 701 can be used with future portable computer types having compatible electrical connectors.

Figure 8:
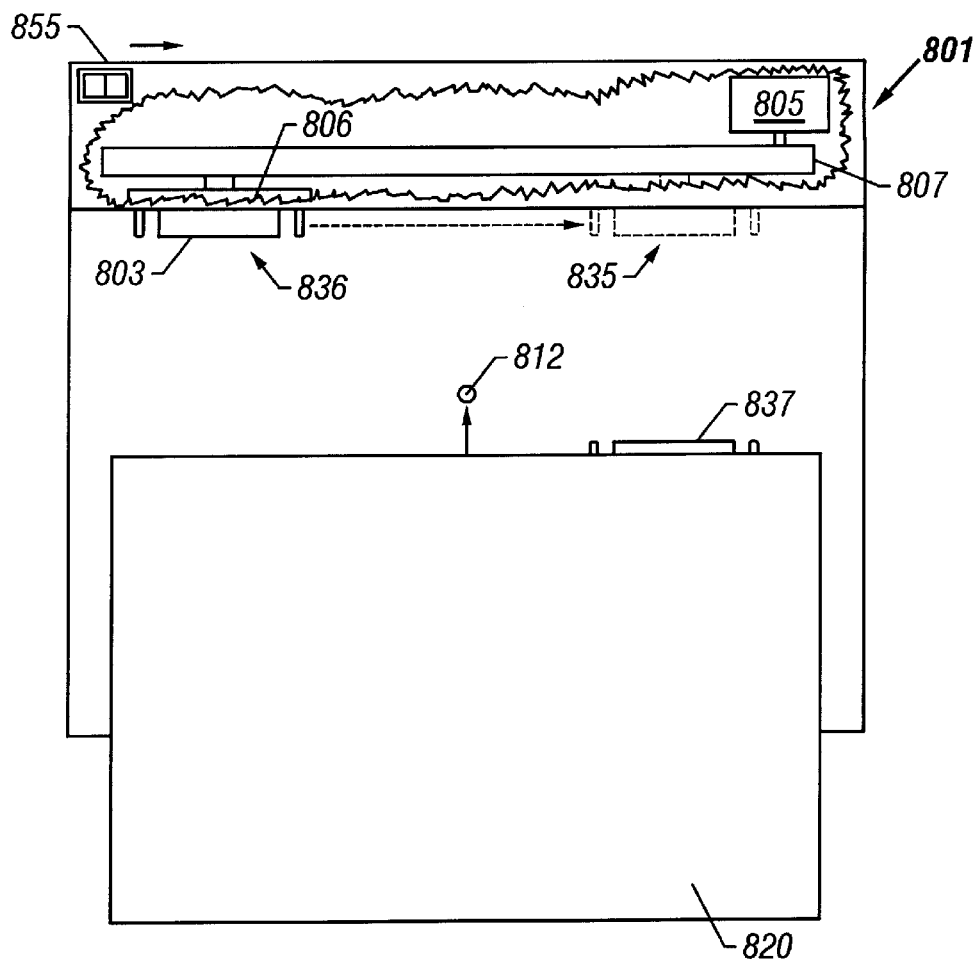
FIG. 8 shows a top view of a docking station having an electrical connector that is movable by an electric motor between mating positions according to the present invention.

FIG. 8 shows a top, partial cut away view of a docking station having a motor to move the docking station electrical connector between mating positions. Docking station 801 includes a stepper motor 805 that turns belt 807 to move the docking station connector 803 laterally between mating positions. Docking station 801 includes a switch 812 for providing an indication to control circuitry (not shown) in docking station 801 of the type of portable computer that is to be docked. As portable computer 820 is moved towards its docking position, spring bias switch 812 is depressed, thereby indicating to the control circuitry that portable computer 820 is of a type where the docking station electrical connector 803 needs to be located at the mating position shown in phantom 835. Accordingly, motor 805 is activated to move docking station connector body 806 (including connector 803) to the position 835 shown in phantom prior to the mating of connector 803 and connector 837. When portable computer 820 is removed from docking station 801, switch 812 returns to a non depressed state wherein motor 805 is activated to move docking station connector body 806 (including connector 803) back to position 836.

A second type of portable computer (not shown) includes a groove in the bottom side of the portable computer extending out from the backside at a location corresponding to switch 812. The electrical connector of the second type of portable computer is located on the backside of the portable computer at a location corresponding to position 836. As the portable computer of the second type is moved towards its docking position, switch 812, moving within the groove, remains in a non depressed state, thereby allowing the portable computer electrical connector to be mated with connector 803 in mating position 836.

The control circuitry (not shown) may be implemented with analog or digital components, or maybe implemented with an integrated circuit chip located within the docking station 801. Based upon the description of the desired movement of the docking station, the specific design of such circuitry is well within the capacity of those skilled in the art.

With other types of motorized docking stations, the motor maybe located at a different location. Also a track, gear track, or other type of drive mechanism may be used to move the docking connector body. Also with other types of docking stations, a motor may utilized to raise and lower the docking station connector with respect to the docking station.

Docking station 801 may also include a manually activated sliding switch 855 which is electrically coupled to the control circuitry to move connector 803 between mating positions. To move connector from mating position 836 to mating position 835, switch 855 is moved to the right.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A docking station for a portable computer comprising:
   a housing;
   a docking station electrical connector physically coupled to the housing, the docking station connector for mating with a corresponding electrical connector of a portable computer when the portable computer is operably coupled to the docking station, the docking station electrical connector being movable with respect to the housing between at least two mating positions to accommodate for variations in location of corresponding portable computer electrical connectors of different portable computer types.

2. The docking station of claim 1 further comprising:
   a docking station connector body that includes the docking station electrical connector.

3. The docking station of claim 1 further comprising:
   a knob structure physically coupled to the docking station electrical connector, the knob structure being actuated by a user to move the docking station electrical connector between the at least two mating positions.

4. The docking station of clam 1 further comprising:
   a retaining device physically coupled to the docking station electrical connector;
   wherein the housing defines at least two retaining structures, each corresponding to a mating position of the at least two mating positions, wherein:
      the retaining device and a first retaining structure are engaged to provide a force to retain the docking station electrical connector in a first mating position;
      the retaining device and a second retaining structure are engaged to provide a force to retain the docking station electrical connector in a second mating position.

5. The docking station of claim 1 wherein the docking station connector is a board-to-board shielded type connector.

6. The docking station of claim 1 further comprising:
   a motor physically coupled to the docking station connector, the motor providing a force to move the docking station connector between the at least two mating positions.

7. The docking station of claim 1 wherein:
   a first mating position is at a different elevation than a second mating position.

8. The docking station of claim 1 further comprising:
   a screw structure, the docking station electrical connector being moveable between the different elevations of the mating positions by rotating the screw structure in the appropriate direction.

9. The docking station of claim 1 further comprising:
   a multiconductor ribbon cable providing a flexible electrical coupling between the docking station electrical connector and peripheral devices operably coupled to the docking station.

10. The docking station of claim 2 wherein the docking station electrical connector is movable with respect to a second portion of the docking station connector body to accommodate variations in elevation with respect to the housing of portable computer electrical connectors of different portable computer types.

11. The docking station of claim 2 wherein:
    the housing defines a groove;
    the docking station connector body includes a structure residing within the groove, the structure being movable within the groove to allow the docking station electrical connector to be moved between mating positions along the groove.

12. The docking station of claim 2 wherein:
    the housing includes a rail structure;
    the docking station connector body defines a groove, the groove engaging the rail structure and movable along the rail structure to allow the docking station electrical connector to be moved between mating positions along the rail structure.

13. The docking station of claim 2 wherein:
    the housing further includes: a wall, the wall defining a slot,
    wherein a portion of the docking station connector body is movable within the slot so as to allow the docking station electrical connector to be movable between the at least two positions.

14. The docking station of claim 2 further comprising:
    a retaining device;
    wherein the docking station connector body defines a retaining structure for receiving the retaining device;
    wherein the housing defines at least two retaining structures for receiving the retaining device, each corresponding to a mating position of the at least two mating positions;
    wherein the retaining device, the retaining structure of the docking station connector body, and a first retaining structure of the at least two retaining structures are engaged to provide a force to retain the docking station electrical connector in a first mating position;
    wherein the retaining device, the retaining structure of the docking station connector body, and a second retaining structure of the at least two retaining structures are engaged to provide a force to retain the docking station electrical connector in a second mating position.

15. The docking station of claim 3 wherein the knob is actuated by applying a force on the knob having a component in the direction of desired movement of the docking station electrical connector with respect to the housing.

16. The docking station of claim 3 wherein the knob is actuated to move the docking station electrical connector from a first mated position towards a second mated position by applying a force on the knob having a component in a generally perpendicular direction to the direction of desired movement of the docking station electrical connector and by applying a force on the knob having a component in the direction of desired movement of the docking station electrical connector with respect to the housing.

17. The docking station of claim 4 wherein the movement of the docking station electrical connector from a first mating position to a second mating position requires the disengagement of the retaining device from the first retaining structure.

18. The docking station of claim 4 wherein the retaining device includes a pin structure and the retaining structures define holes for receiving the pin.

19. The docking station of claim 4 wherein the retaining device includes a wheel and the retaining structures define notches to receive the wheel.

20. The docking station of claim 4 wherein the retaining device includes a detent the retaining structure defines notches to receive the detents.

21. The docking station of claim 4 wherein the retaining device includes a notch and the retaining structures include detents receivable in the notch.

22. The docking station of claim 6 further comprising:
a belt engaging a structure physically coupled to the docking station electrical connector and physically coupled to the motor, the force from the motor moving the belt to move the docking station electrical connector between the at least two mating positions.

23. The docking station of claim 6 further comprising:
a switch for activating the motor to move the docking station electrical connector from a first mating position to a second mating position.

24. The docking station of claim 10 wherein the housing further includes:
a wall, the wall defining a slot,
wherein a portion of the docking station connector body is movable within the slot so as to allow the docking station electrical connector to be movable between the at least two positions;
wherein the slot has at least two levels with each level at a different elevation to accommodate for the variations in elevation of portable computer electrical connectors of different portable computer types, the portion of the docking station connector body is movable between the at least two levels.

25. The docking station of claim 10 wherein the second portion includes a carriage with a portion of the carriage being located within the docking station housing, the carriage being laterally movable with respect to the housing to move the docking station electrical connector in a lateral direction in moving the docking station electrical connector between the at least two mating positions.

26. The docking station of claim 11 wherein:
the docking station connector body includes a sliding plate fixably coupled to the docking station electrical connector;
the structure is a wing structure of the sliding plate.

27. The docking station of claim 13 wherein the wall is positioned such that when the portable computer is operably coupled to the docking station, the wall generally faces the back panel of the portable computer.

28. The docking station of claim 13 wherein the docking station electrical connector extends out from the slot.

29. The docking station of claim 14 wherein the retaining device includes a screw and the retaining structures include threaded holes.

30. The docking station of claim 23 wherein the switch is manually activated.

31. The docking station of claim 23 wherein the switch is activated by a structure of a portable computer during the docking of the portable computer.

32. A docking station for a portable computer comprising:
a housing;
a docking station electrical connector physically coupled to the housing for mating with a corresponding electrical connector of a portable computer when the portable computer is operably coupled to the docking station;
means for moving the docking station electrical connector with respect to the housing between at least two mating positions to accommodate for variations in location of corresponding portable computer electrical connectors of different portable computer types.

33. A computer system comprising:
a portable computer including an electrical connector;
a docking station, the docking station including:
a housing; and
a docking station electrical connector physically coupled to the housing, the docking station electrical connector for mating with the electrical connector of the portable computer when the portable computer is operably coupled to the docking station, the docking station electrical connector being movable with respect to the housing between at least two mating positions to accommodate for variations in location of portable computer electrical connectors of different portable computer types.

34. The computer system of claim 33 further comprising:
a knob structure physically coupled to the docking station electrical connector, the knob structure being actuated by a user to move the docking station electrical connector between the at least two positions.

35. The computer system of claim 33 further comprising:
a docking station connector body that includes the docking station electrical connector;
the housing further includes:
a wall, the wall defining a slot,
wherein a portion of the docking station connector body extends out from and is movable within the slot so as to allow the docking station electrical connector to be movable between the at least two positions.

36. The computer system of claim 33 wherein:
a first mating position is at a different elevation with respect to the housing than a second mating position, the docking station electrical connector being movable between the first elevation and the second elevation.

37. The computer system of claim 33 further comprising:
a peripheral device, the portable computer being operably coupled to the peripheral device via the mating of the docking station electrical connector and the portable computer electrical connector.

38. The computer system of claim 33 wherein the docking station further includes:
a multiconductor ribbon cable providing a flexible electrical coupling between the docking station electrical connector and peripheral devices operable coupled to the docking station.

* * * * *